Oct. 4, 1932.                    G. PIRINOLI                    1,881,292
DRIVING MECHANISM FOR THE AUXILIARY APPARATUS
          OF INTERNAL COMBUSTION ENGINES
                Filed March 25, 1931

Inventor
Guglielmo Pirinoli
By
Henry Orth Jr
   atty

Patented Oct. 4, 1932

1,881,292

UNITED STATES PATENT OFFICE

GUGLIELMO PIRINOLI, OF TURIN, ITALY, ASSIGNOR TO FIAT SOCIETÁ ANONIMA, OF TURIN, ITALY

DRIVING MECHANISM FOR THE AUXILIARY APPARATUS OF INTERNAL COMBUSTION ENGINES

Application filed March 25, 1931, Serial No. 525,278, and in Italy March 29, 1930.

This invention relates to a device for transmitting power from the engine shaft of a radial engine for aircraft to the forced feed compressor, oil pump, pressure air distributor to the engine, revolution counter and fuel supply pump, its object being chiefly to reduce the size and weight of the unit constituted by the various above mentioned members.

According to this invention, the compressor for the forced feed is driven by a shaft deriving motion through a suitable multiplying gear from the main shaft through an auxiliary shaft serving also for driving the oil pump; the distributor of pressure air to the engine, the revolution counter and the fuel supply pump being driven by another auxiliary shaft also operated by the engine shaft.

The three above mentioned shafts are preferably parallel to the engine shaft and the shaft on which the compressor wheel is keyed is co-axial to and rotates at a considerably higher speed than the engine shaft. The transmission ratios between the engine shaft and the said shaft depend upon the requirements of the various apparatus driven by these latter.

The accompanying drawing shows by way of example a construction of the power transmission device according to this invention.

Figure 1:
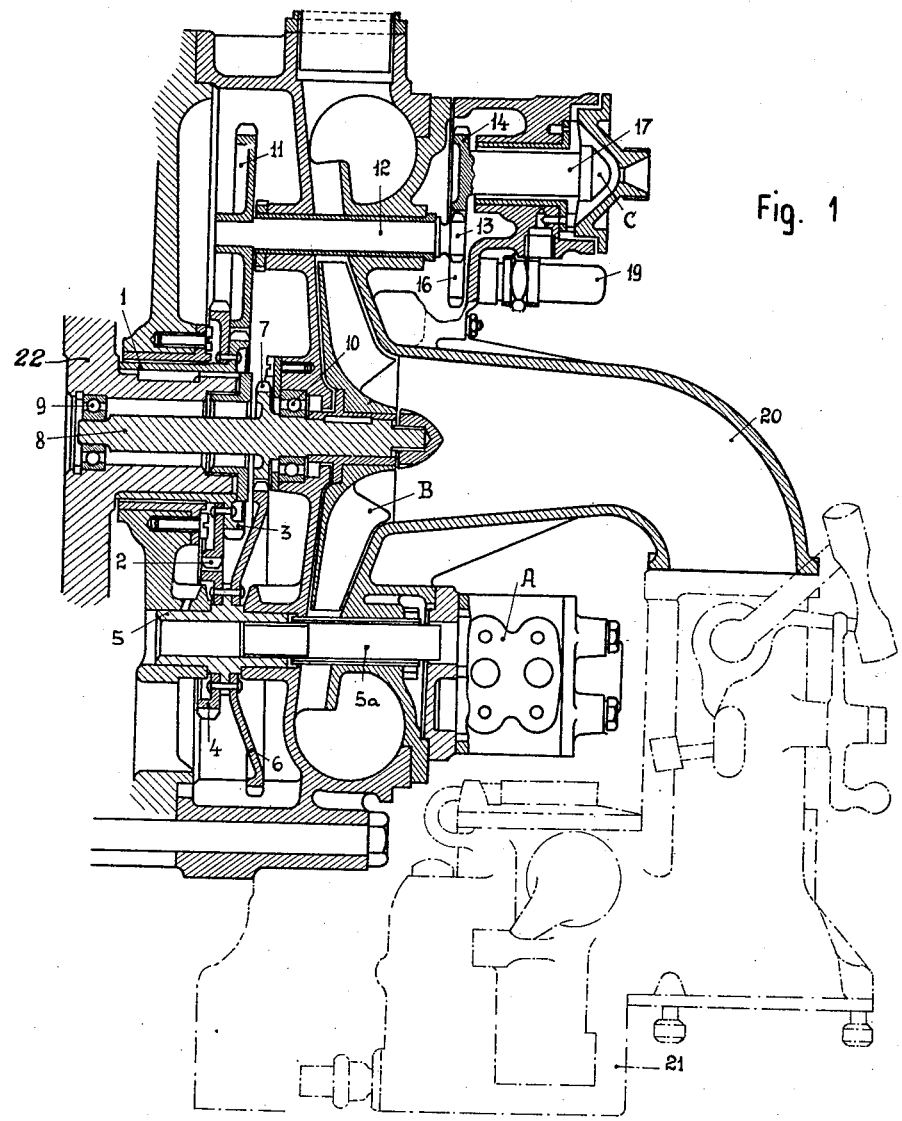
Figure 1 is a longitudinal section of the unit.
Figure 2:
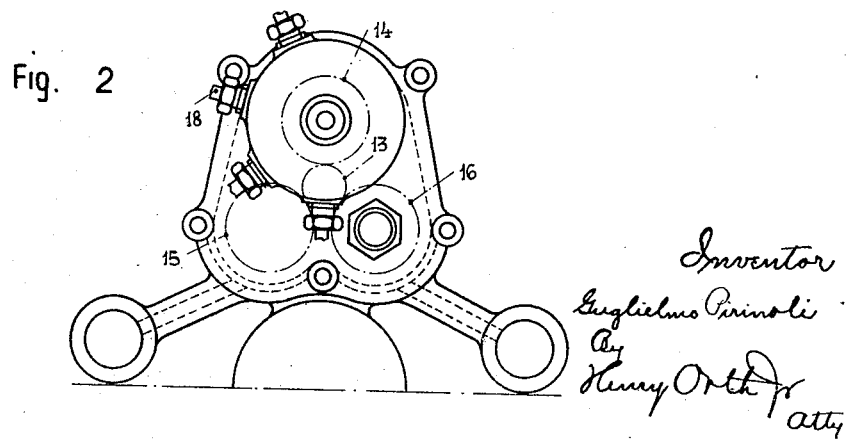
Figure 2 is a detail view of the mechanism driving the air distributor to the engine, the revolution counter and the fuel pump.

A sleeve 1 is connected to the main engine shaft 22 and carries at one end two toothed wheels 2 and 3 from which the movement of the shafts is derived. The toothed wheel 2 meshes with a toothed wheel 4, carried by a sleeve 5, to which an auxiliary shaft 5a rotating on a suitable bearing is keyed, said auxiliary shaft driving at one end an oil pump A. The sleeve 5 carries also a toothed wheel 6 of a considerably larger diameter than the toothed wheel 4 and meshing with a toothed wheel 7 keyed on the shaft 8. This latter carries at one end the wheel B for the forced feed compressor and is mounted on two roller bearings 9 and 10.

By virtue of the transmission ratios provided for in this construction between the pairs of toothed wheels 2, 4 and 6, 7 the shaft 8 is rotated at a speed which is about four times that of the sleeve 1, said shaft 8 being co-axial to the sleeve and extending a certain length into this latter.

The toothed wheel 3 of the sleeve 1 meshes with a toothed wheel 11 mounted on an auxiliary shaft 12, which is rotated at a speed substantially equal to that of the engine shaft. The shaft 12 carries at one end a pinion 13 meshing simultaneously with the three toothed wheels 14, 15 and 16 having the same diameter. The toothed wheel 14 is mounted at the end of a shaft 17 carrying a distributor C communicating with a pressure air tank and supplying pressure air through the pipes 18 to the various engine cylinders. The toothed wheel 15 can be connected with a flexible transmission leading to the revolution counter of the engine situated in proximity to the pilot, while the toothed wheel 16 can drive the petrol supply or pumps through a suitable transmission. In the example shown this transmission is omitted and a protecting cap 19 is applied at the point where the transmission shall be attached. The compressor B is mounted at the end of a pipe 20 branched from the engine carburetor 21.

The driving mechanism forms a compact unit of small size and of extremely reduced weight, which builds a considerable improvement over the transmission mechanisms employed heretofore in this type of engines.

It will be obvious that some details, such as the number of auxiliary shafts, the ratios of the gear transmissions and others can vary from those described above by way of example without departing from the scope of my invention.

What I claim is:

1. In an internal combustion engine, in combination with a compressor, an oil pump, a pressure air distributor to the engine and a fuel pump, a driving mechanism comprising a shaft co-axial to the engine shaft and carrying the compressor wheel, a first auxiliary shaft passing through the casing of said compressor and driving the oil pump, a gear for transmitting motion from the engine shaft to said auxiliary shaft, a multiplying gear for transmitting motion from said auxiliary shaft to the compressor shaft, a second auxiliary shaft extending through the casing of said compressor and a pinion on said second auxiliary shaft which drives simultaneously said distributor and said fuel pump.

2. In an internal combustion engine, in combination with a compressor, a lubricating oil pump, a pressure air distributor and a fuel supply pump, a driving mechanism comprising a shaft mounted co-axially within the hollow end of the engine shaft and carrying the compressor wheel, a first auxiliary shaft rotatably mounted in the casing of said compressor parallel to the compressor shaft and driving the oil pump, a gear for transmitting motion from the engine shaft to said first auxiliary shaft, a multiplying gear for transmitting motion from said first auxiliary shaft to the compressor shaft, a second auxiliary shaft rotatably mounted in the compressor casing parallel to said engine shaft and carrying a pinion which drives simultaneously the distributor and the petrol supply pump.

3. In an internal combustion engine, in combination with a compressor, an oil pump, a pressure air distributor to the engine, a fuel pump and a revolution counter, a driving mechanism comprising a shaft co-axial to the engine shaft and carrying the compressor wheel, a first auxiliary shaft passing through the casing of said compressor and driving the oil pump, a gear for transmitting motion from the engine shaft to said auxiliary shaft, a multiplying gear for transmitting motion from said auxiliary shaft to the compressor shaft, a second auxiliary shaft extending through the casing of said compressor and a pinion on said second auxiliary shaft which drives simultaneously said distributor, said revolution counter and said fuel pump.

4. In an internal combustion engine, in combination with a compressor and a lubricating oil pump, a driving mechanism comprising an engine shaft, a shaft carrying the compressor wheel and rotatably mounted in an axial recess at one end of said engine shaft, a secondary shaft rotatably mounted in the casing of said compressor and adapted to drive the lubricating oil pump and a multiplying gear for transmitting motion from said engine shaft to said compressor shaft through said secondary shaft.

In testimony that I claim the foregoing as my invention, I have signed my name.

GUGLIELMO PIRINOLI.